(12) United States Patent
Archer

(10) Patent No.: US 10,207,246 B2
(45) Date of Patent: Feb. 19, 2019

(54) FUEL ACTIVATION AND ENERGY RELEASE APPARATUS, SYSTEM AND METHOD THEREOF

(71) Applicant: ARCS Energy, Middlesex (GB)

(72) Inventor: Anthony Archer, Middlesex (GB)

(73) Assignee: ARCS ENERGY, Middlesex (GB)

( * ) Notice: Subject to any disclaimer, the term of this patent is extended or adjusted under 35 U.S.C. 154(b) by 0 days.

(21) Appl. No.: 15/541,282

(22) PCT Filed: Dec. 30, 2015

(86) PCT No.: PCT/GB2015/054175
§ 371 (c)(1),
(2) Date: Jul. 14, 2017

(87) PCT Pub. No.: WO2016/110674
PCT Pub. Date: Jul. 14, 2016

(65) Prior Publication Data
US 2018/0154330 A1    Jun. 7, 2018

(30) Foreign Application Priority Data
Jan. 5, 2015 (GB) .................................. 1500057.3

(51) Int. Cl.
*B01J 19/02* (2006.01)
*F02M 27/04* (2006.01)
(Continued)

(52) U.S. Cl.
CPC ........... *B01J 19/126* (2013.01); *B01J 19/128* (2013.01); *F02M 27/04* (2013.01); *F02M 31/02* (2013.01);
(Continued)

(58) Field of Classification Search
None
See application file for complete search history.

(56) References Cited

U.S. PATENT DOCUMENTS

| 3,934,566 A | 1/1976 | Ward |
| 4,064,852 A | 12/1977 | Fulenwider, Jr. |

(Continued)

FOREIGN PATENT DOCUMENTS

| CN | 1991156 A | 7/2007 |
| CN | 101008367 A | 8/2007 |

(Continued)

OTHER PUBLICATIONS

International Search Report and Written Opinion for application PCT/GB2015/054175 dated Mar. 9, 2016.
(Continued)

*Primary Examiner* — Kishor Mayekar
(74) *Attorney, Agent, or Firm* — Workman Nydegger

(57) ABSTRACT

A fuel activation and energy release apparatus is provided for increasing energy output of a fluid substance. The apparatus comprises a fluidly sealable reactor chamber, adapted to withstand a predetermined fluid pressure and temperature; a fluid injection port, adapted to provide a one-way fluid communication from an external fluid reservoir to said reactor chamber; a fluid ejection port, adapted to provide a one-way fluid communication from said reactor chamber to an external region, so as to controllably release said fluid substance from said reactor chamber and at least one first electromagnetic radiation (EMR) waveguide. The first EMR waveguide having a first waveguide input port and a first waveguide output port, operably coupled within said reactor chamber and adapted to couple electromagnetic radiation of a predetermined first wavelength to a fluid substance injected into said reactor chamber.

19 Claims, 8 Drawing Sheets

(51) Int. Cl.
  *F02M 31/02* (2006.01)
  *B01J 19/12* (2006.01)
  *F02P 23/04* (2006.01)
(52) U.S. Cl.
  CPC ............... *B01J 2219/0004* (2013.01); *B01J 2219/0875* (2013.01); *B01J 2219/0877* (2013.01); *B01J 2219/1215* (2013.01); *B01J 2219/1227* (2013.01); *B01J 2219/1239* (2013.01); *B01J 2219/1254* (2013.01); *B01J 2219/1269* (2013.01); *B01J 2219/1272* (2013.01); *B01J 2219/1293* (2013.01); *F02P 23/045* (2013.01)

(56) References Cited

U.S. PATENT DOCUMENTS

| | | |
|---|---|---|
| 5,719,380 A | 2/1998 | Coopes |
| 2004/0101441 A1* | 5/2004 | Jennings .................. G01N 1/44 422/82.13 |
| 2005/0127068 A1* | 6/2005 | Tang ...................... H05B 6/701 219/700 |
| 2010/0296977 A1* | 11/2010 | Hancock .................. A61L 2/14 422/186 |
| 2011/0263843 A1* | 10/2011 | Watanabe .............. B01J 19/126 536/128 |
| 2012/0108818 A1 | 5/2012 | Hagberg |
| 2013/0206582 A1 | 8/2013 | Apiecionek |
| 2013/0240507 A1* | 9/2013 | Kimrey, Jr. .............. H05B 6/70 219/702 |
| 2014/0363348 A1 | 12/2014 | Ishizuka |

FOREIGN PATENT DOCUMENTS

| | | |
|---|---|---|
| CN | 101713355 A | 5/2010 |
| CN | 202949584 U | 5/2013 |
| JP | H1190216 A | 4/1999 |
| WO | WO2013/070095 A1 | 5/2013 |

OTHER PUBLICATIONS

Search Report under Section 17(5) for application GB1500057.3 dated Jul. 10, 2015.
Chinese Office Action for application 201580071468.2 dated Mar. 9, 2018.

* cited by examiner

FUEL ACTIVATION AND ENERGY RELEASE APPARATUS, SYSTEM AND METHOD THEREOF

The present invention relates generally to the field of energy generation and improvement in fuel efficiency, as well as, reduction of harmful emissions. In particular, the present invention relates to an apparatus for improved energy release from any fluid substance.

INTRODUCTION

The search for potent, dependable and sustainable energy sources is becoming increasingly urgent in order to provide for the ever-increasing demand for energy. The industrialized world has primarily evolved around the combustion engine, which is capable of providing mechanical energy to do work in a vast variety of circumstances. However, while the employment of combustion engines has significantly increased the industrial output, it is certainly not without detriment. For example, combustion engines run, for the most part, on fossil fuels such as gasoline and diesel fuel (i.e. hydrocarbons), which are primarily derived by the refinement of crude oil and which provide an easily transportable reservoir of energy for mobile engines (automobile, ships, planes etc.). However, the burning of fuel in such engines is never completely efficient and as a consequence, engines employing conventional gas and diesel fuel suffer from excess fuel consumption and low engine efficiency. Furthermore, potentially harmful emissions and exhausts may contribute pollutants and greenhouse gasses such as NOx (oxides of Nitrogen), unburnt He (hydrocarbons), CO (Carbon Monoxide), $NO_2$ (nitrogen dioxide), NO (nitric oxide) to the atmosphere.

Consequently, once the industrial world has understood that fossil fuels are a finite resource with detrimental side effects, alternative energy sources, such as, for example, solar energy, wind energy, geothermal, energy biofuel, and nuclear energy, have been utilized. However, in spite of all efforts to provide sufficient energy from alternative energy sources, fossil fuels remain the most feasible feedstock at least in the near future.

Therefore, any apparatus, system or method that can either extract useable energy from abound substances and/or increase the efficiency of a fuel would be a very desirable addition to the currently available energy sources.

Accordingly, it is an object of the present invention to provide an apparatus and system that is adapted to provide a useable energy output from any fluid substance and/or increase the energy output of a fuel substance. In addition, it is an object of the present invention to provide an apparatus and system for "cleaning up" exhaust flue gases.

SUMMARY OF THE INVENTION

Preferred embodiment(s) of the invention seek to overcome one or more of the above disadvantages of the prior art.

According to a first embodiment of the invention there is provided a fuel activation and energy release apparatus for increasing energy output of a fluid substance, comprising:
 a fluidly sealable reactor chamber, adapted to withstand a predetermined fluid pressure and temperature;
 a fluid injection port, adapted to provide a one-way fluid communication from an external fluid reservoir to said reactor chamber;
 a fluid ejection port, adapted to provide a one-way fluid communication from said reactor chamber to an external region, so as to controllably release said fluid substance from said reactor chamber;
 at least one first electromagnetic radiation (EMR) waveguide, having a first waveguide input port and a first waveguide output port, operably coupled within said reactor chamber and adapted to couple electromagnetic radiation of a predetermined first wavelength to a fluid substance injected into said reactor chamber.

The apparatus provides the advantage that the energy state of the injected fluid substance (e.g. free radicals gas) is increased by the "coupling" electromagnetic radiation (i.e. the predetermined wavelength of the electromagnetic radiation is matched to the electron energy state of the free radicals), therefore providing a highly reactive substance adapted to release a significantly increased amount of energy that can be utilised, for example, to provide work (e.g. via a turbine). In addition, the highly reactive substance is further adapted to minimise any potential emission exhaust when being combusted. Alternatively, the apparatus of the present invention may be utilised in existing combustion engines to significantly increase the fuel efficiency (i.e. extracting more energy from the fuel) and subsequently minimising its emission exhausts.

The fuel activation and energy release apparatus may further comprise at least one second electromagnetic radiation waveguide, having a second waveguide input port operably coupled to said reactor chamber, adapted to couple electromagnetic radiation (EMR) of a predetermined second wavelength to a fluid substance injected into said reactor chamber. This provides the advantage of stabilising the reaction (i.e. prolong/maintain reaction within the chamber) between the first electromagnetic radiation and the fluid substance in the reactor chamber.

Advantageously, the fluid ejection port may be selectively closable. Preferably, the predetermined first wavelength is between 1 mm and 1 meter at a respective frequency spectrum of 300 GHz to 300 MHz (microwave). Furthermore, the predetermined second wavelength may be between 700 nm and 1 mm at a respective frequency spectrum of 430 THz to 300 GHz (Infrared).

Advantageously, the at least one first EMR waveguide may be coaxially mounted within said reactor chamber. Preferably, the predetermined pressure may be greater than 50 bar and said predetermined temperature may be greater than 300 degrees centigrade. Even more preferably, the predetermined pressure may be greater than 100 bar and said predetermined temperature may be greater than 500 degrees centigrade. Even more preferably, the predetermined pressure may be greater than 150 bar and said predetermined temperature may be greater than 600 degrees centigrade.

Advantageously, the at least one first electromagnetic radiation (EMR) waveguide may be made of a material with a low bulk resistivity (Ohm·cm). Preferably, the at least one first electromagnetic radiation (EMR) waveguide may be made of any one of aluminium, copper, silver and gold.

Alternatively, said at least one first electromagnetic radiation (EMR) waveguide may comprise an optical interface adapted to couple electromagnetic radiation of said predetermined first wavelength into said reactor chamber. Preferably, said optical interface may further comprise a first interface member operably coupled to said waveguide input port and a second interface member operably coupled to said waveguide output port.

According to a second embodiment of the invention there is provided a system for increasing energy output of a fluid substance, comprising:
- at least one fuel activation and energy release apparatus according to the first embodiment;
- a tunable EMR generator, operably coupleable to at least one first electromagnetic radiation (EMR) waveguide of said at least one fuel activation and energy release apparatus;
- a working medium reservoir, fluidly coupleable to a reactor chamber of said fuel activation and energy release apparatus and adapted to store and supply a working medium;
- a heater assembly, fluidly coupleable between said working medium reservoir and said reactor chamber, and adapted to transfer energy to said working medium, so as to provide an energised fluid substance at a predetermined temperature and pressure into said reactor chamber of said fuel activation and energy release apparatus.

Advantageously, the EMR generator may further comprise an input transmission line, operably coupleable to a first waveguide input port of a first electromagnetic radiation (EMR) waveguide of said fuel activation and energy release apparatus, and an output transmission line, operably coupleable to a first waveguide output port of the first electromagnetic radiation (EMR) waveguide of said fuel activation and energy release apparatus, wherein said microwave generator, said input transmission line and said output transmission line are adapted to form a closed-loop EMR circuit with said first electromagnetic radiation (EMR) waveguide of the fuel activation and energy release apparatus.

Advantageously, the system may further comprise an EMR tuner operably coupled to said output transmission line and adapted to minimise reflection of electromagnetic radiation (EMR) generated by said EMR generator and coupled into said first electromagnetic radiation (EMR) waveguide of the fuel activation and energy release apparatus. Preferably, the EMR tuner may be further adapted to maximise energy transfer from the electromagnetic radiation (EMR) to the energised fluid substance injected into the reactor chamber of the fuel activation and energy release apparatus. Even more preferably, the EMR tuner may be a manually controlled trombone tuner. Alternatively, the EMR tuner may be an automatically controlled EMR tuner.

Advantageously, the EMR generator may be a microwave generator and the generated electromagnetic radiation has a wavelength between 1 mm and 1 meter at a respective frequency spectrum of 300 GHz to 300 MHz (microwave).

Preferably, the heater assembly may comprise at least one pre-heater, disposed upstream of said working medium reservoir, and at least one super-heater, disposed upstream of said pre-heater.

Advantageously, the system may further comprise at least one fluid pump, disposed upstream of said working medium reservoir and downstream of said heater assembly, and adapted to move said working medium from said working medium reservoir towards the reactor chamber of said fuel activation and energy release apparatus. Even more advantageously, the system may further comprise at least one pressure control device, adapted to monitor and regulate the pressure of said energised fluid substance.

Preferably, the microwave generator may be any one of a Klystron, a Gyrotron and a Magnetron.

BRIEF DESCRIPTION OF THE DRAWINGS

Preferred embodiments of the present invention will now be described, by way of example only and not in any limitative sense, with reference to the accompanying drawings, in which.

DETAILED DESCRIPTION OF THE PREFERRED EMBODIMENT(S)

Figure 1A:
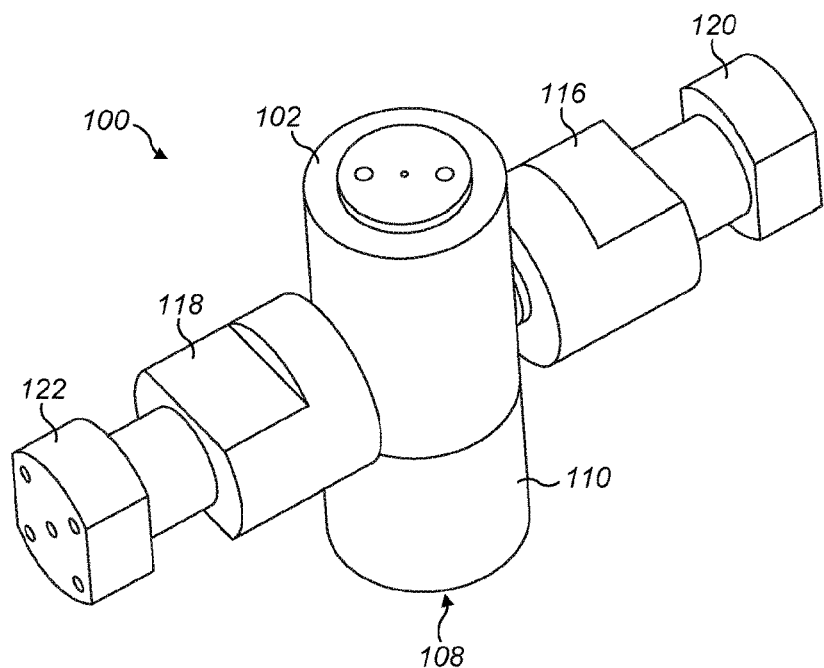
FIG. 1 shows a perspective view of an example of the apparatus of the present invention (a) in its assembled state and (b) in an exploded view of its disassembled state.
Figure 1B:
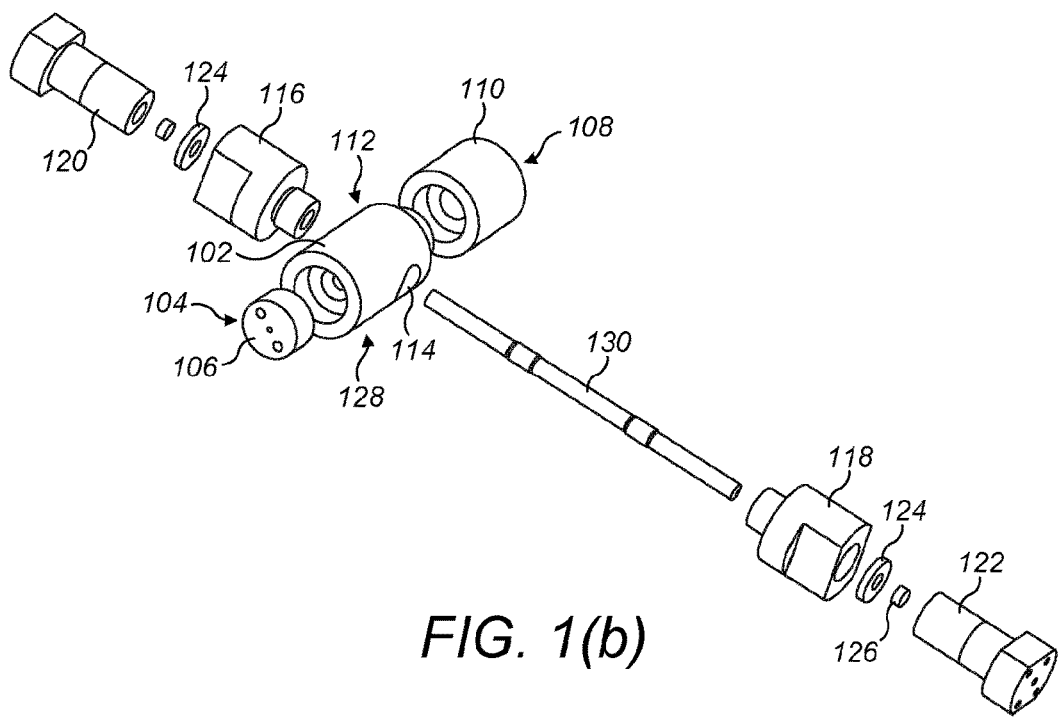

Exemplary embodiments of this invention will be described in relation to an energy source generator and a system adapted to improve fuel efficiency, both of which are retrospectively fittable with the apparatus of the present invention. However, it will be appreciated by the person skilled in the art that the apparatus and system of the present invention may be utilised with any suitable energy conversion or power generation system.

Referring now generally to FIGS. 1 to 10, an example embodiment of the main reactor unit 100 of the present invention comprises a main body 102 having a central reactor chamber 103, an injection port 104, including an end cap 106 that is screwed into an opening of the injection port 104, and an ejection port 108, including a gas coupler 110 that is connected to the ejection port 108 (e.g. screw fit). The main body 102 further comprises access ports 112 and 114 adapted to receive and mount EMR input members 116 and 118. Two EMR couplers 120 and 122 are mounted to respective input members 116 and 118 utilising ceramic discs 124 and ceramic end caps 126 to provide a sufficient fluid seal between the EMR couplers 120, 122 and respective EMR input members 116, 118.

The main body 102 further comprises an ancillary EMR port 128 (also referred to herein as a second electromagnetic radiation waveguide) adapted to receive an ancillary EMR source interface, so as to allow a predetermined electromagnetic radiation of the ancillary EMR source to be emitted into the reactor chamber 103. For example, the ancillary EMR source may be an infrared (IR) input (e.g. a 7.0 μm optically immersed led, 1.2V to 2.1V) suitably adapted to extend the life of a high-energy state in the injected fluid. All inlet and outlet ports (i.e. 104, 108, 112, 114 and 128) are positioned so as to lead into the reactor chamber 103 of the main body 102. The input members 116 and 118 are further adapted to receive and coaxially mount an EMR waveguide bar 130 within the reactor chamber 103.

In an alternative embodiment, the EMR couplers 120, 122 may be coupled to a first and second optical interface, each mounted within respective input members 116, 118, and arranged to "feed" into the reactor chamber 103. This allows the reactor chamber 103 to be hermetically sealed, since the electromagnetic energy is coupled into the chamber via the first and second optical interface (which may be an integral part of the inner wall of the reactor chamber 103). A standing wave may be generated within the reactor chamber 103 between first and second optical interface.

Figure 2:
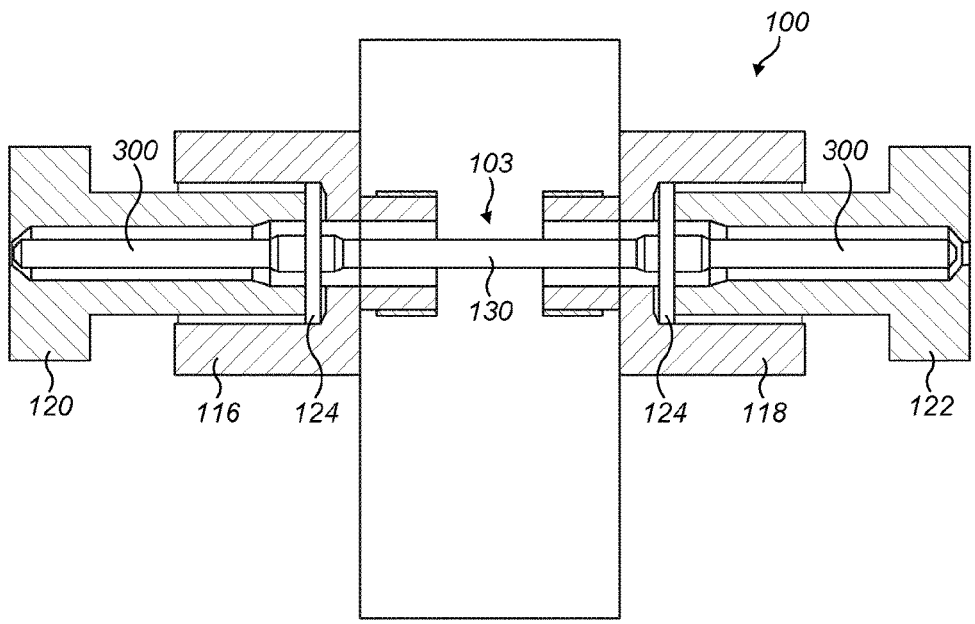
FIG. 2 shows a sectional view of the assembled apparatus shown in FIG. 1 highlighting the potential areas of coaxial line contamination (e.g. input/output ceramic puck)
Figure 3:
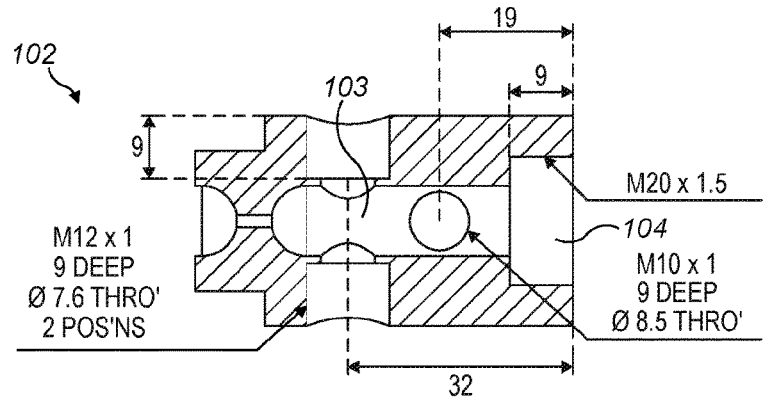
FIG. 3 shows a sectional side view, top view and front view of the main body (reactor chamber) of the apparatus of the present invention.
Figure 3:
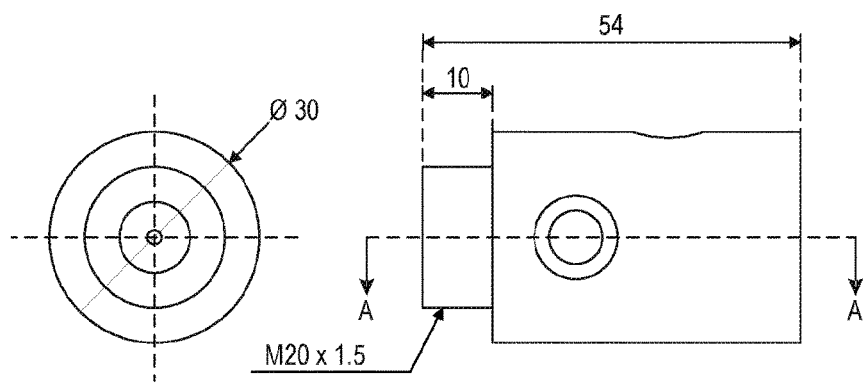
Figure 4:
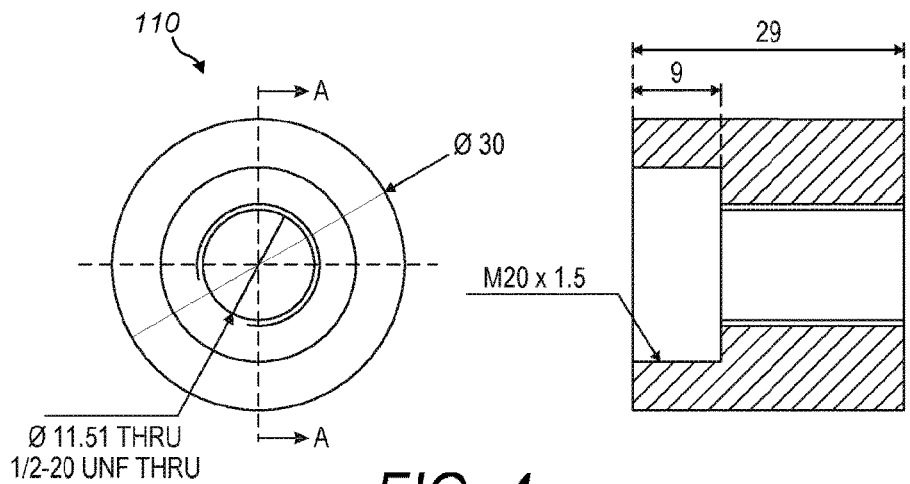
FIG. 4 shows a sectional side view and front view of the gas coupler member of the apparatus of the present invention.
Figure 5:
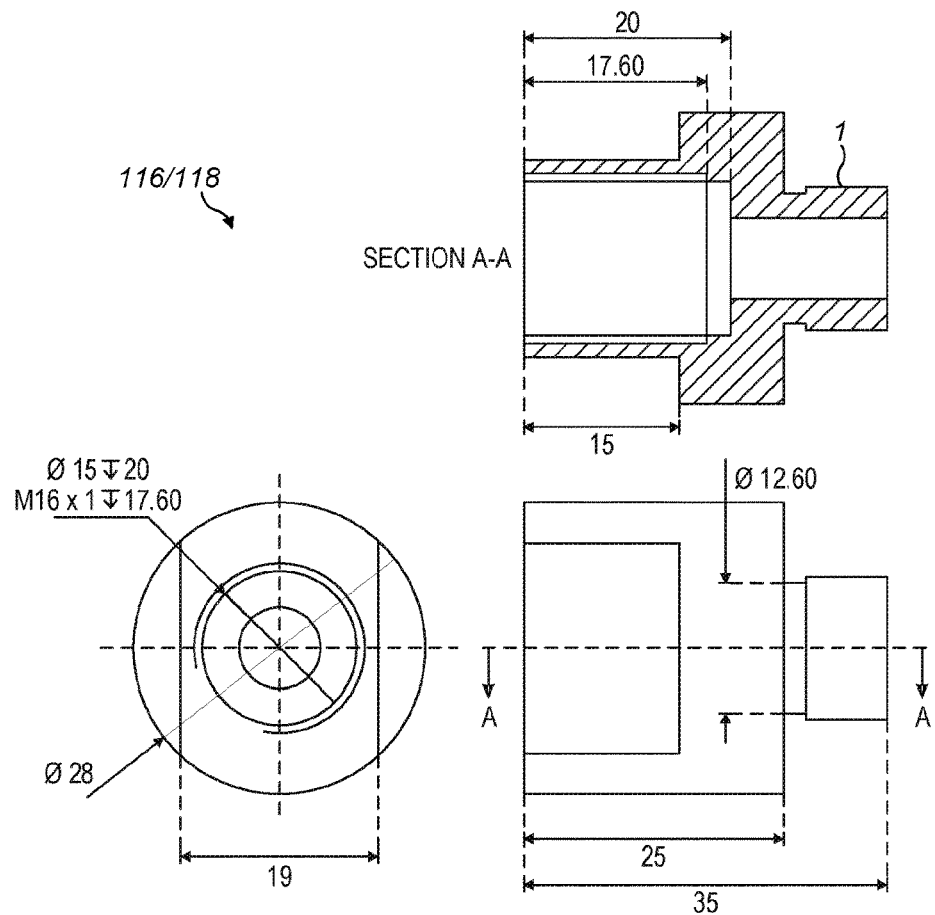
FIG. 5 shows a sectional side view, top view and front view of the input and output member (same as input member) of the apparatus of the present invention, which house the ceramic pucks.
Figure 6:
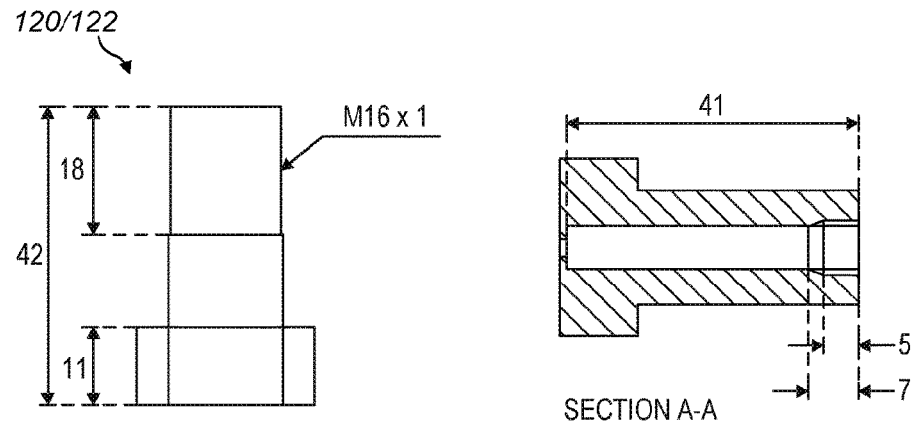
FIG. 6 shows a sectional side view and side view, top view and front view of the screw-in member of the apparatus of the present invention, which provides the transition from the external coaxial waveguide to the internal coaxial waveguide.
Figure 6:
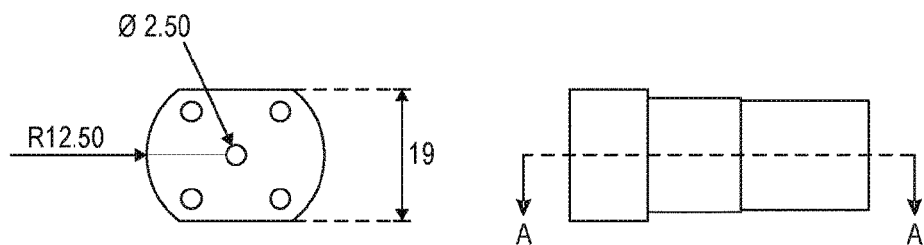
Figure 7:
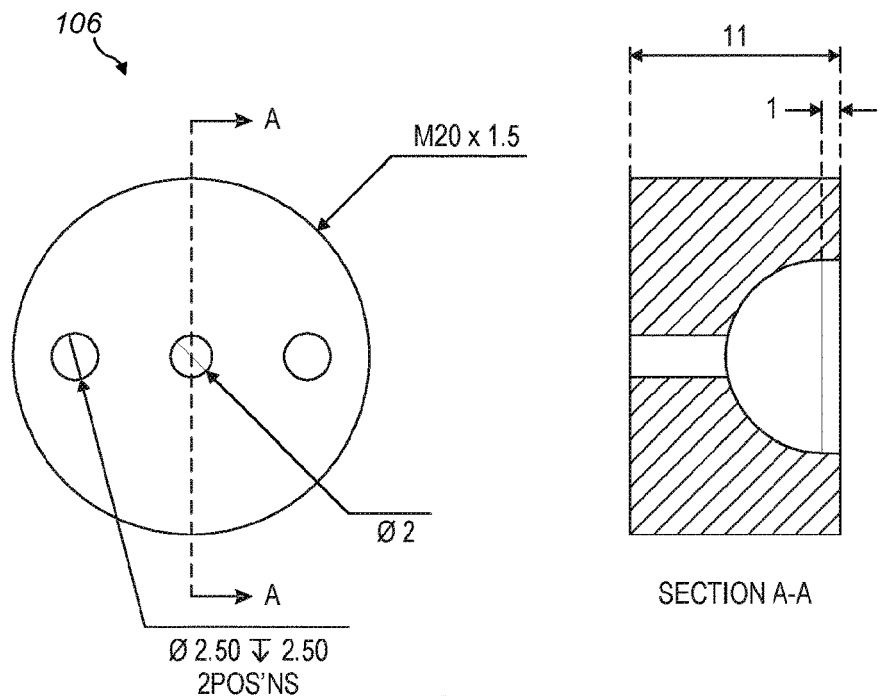
FIG. 7 shows a sectional side view and front view of the end cap member of the apparatus of the present invention.
Figure 8:
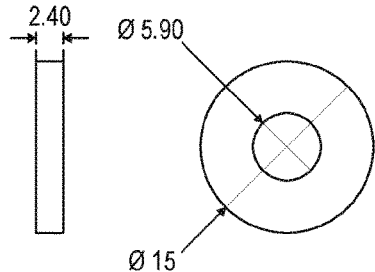
FIG. 8 shows a side view and front view of the ceramic puck of the apparatus of the present invention.
Figure 9:
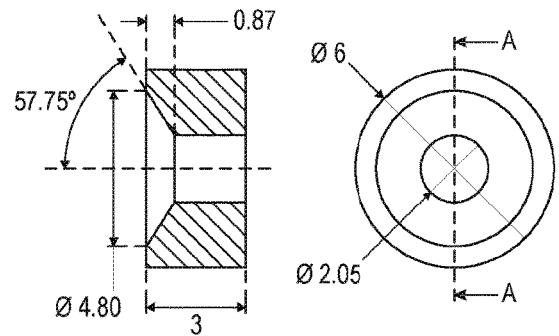
FIG. 9 shows a sectional side view and front view of the ceramic end cap of the apparatus of the present invention.
Figure 10A:
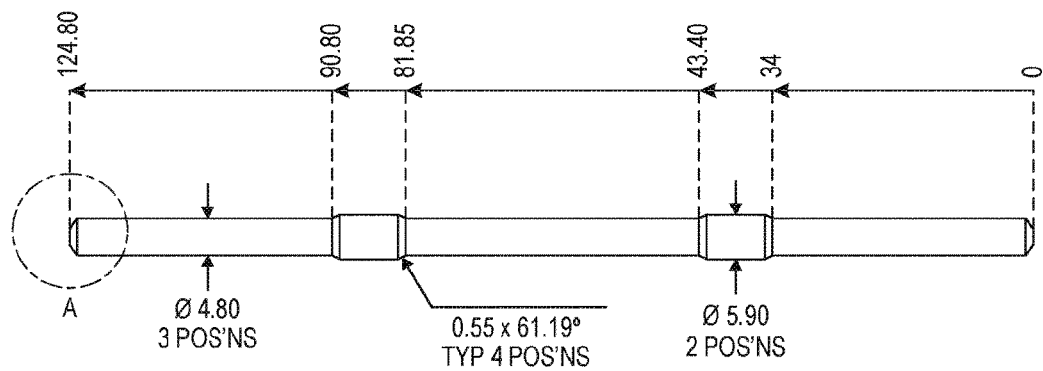
FIG. 10 shows (a) a side view, (b) enlarged partial view and (c) a front view of the bar member (internal coaxial waveguide) of the apparatus of the present invention.
Figure 10B:
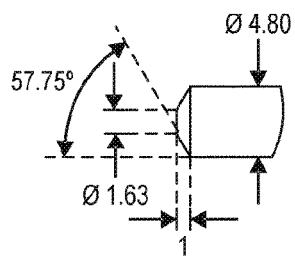
Figure 10C:
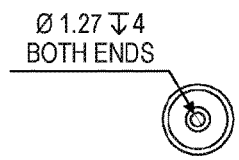

FIG. 2 illustrates a sectional view of the assembled main reactor unit 100, showing the location of the ceramic discs 124 and contaminant-free regions 300 that are kept free of contamination due to the sealing properties of the ceramic disc 124. It is understood that any sealant may be used in addition to, or instead of the ceramic discs 124, to keep the contaminant-free regions 300 free from any leaking fluids. For example, sealant may be applied to the screw threads of the engaging input members 116, 118 and EMR couplers 120, 122.

FIGS. 3 to 10 shows detailed examples of each one of the components of the main reactor unit assembly 100. However, it is understood that dimensions and design of the individual components may differ without compromising the characterising inventive concept of the present invention.

Figure 11:
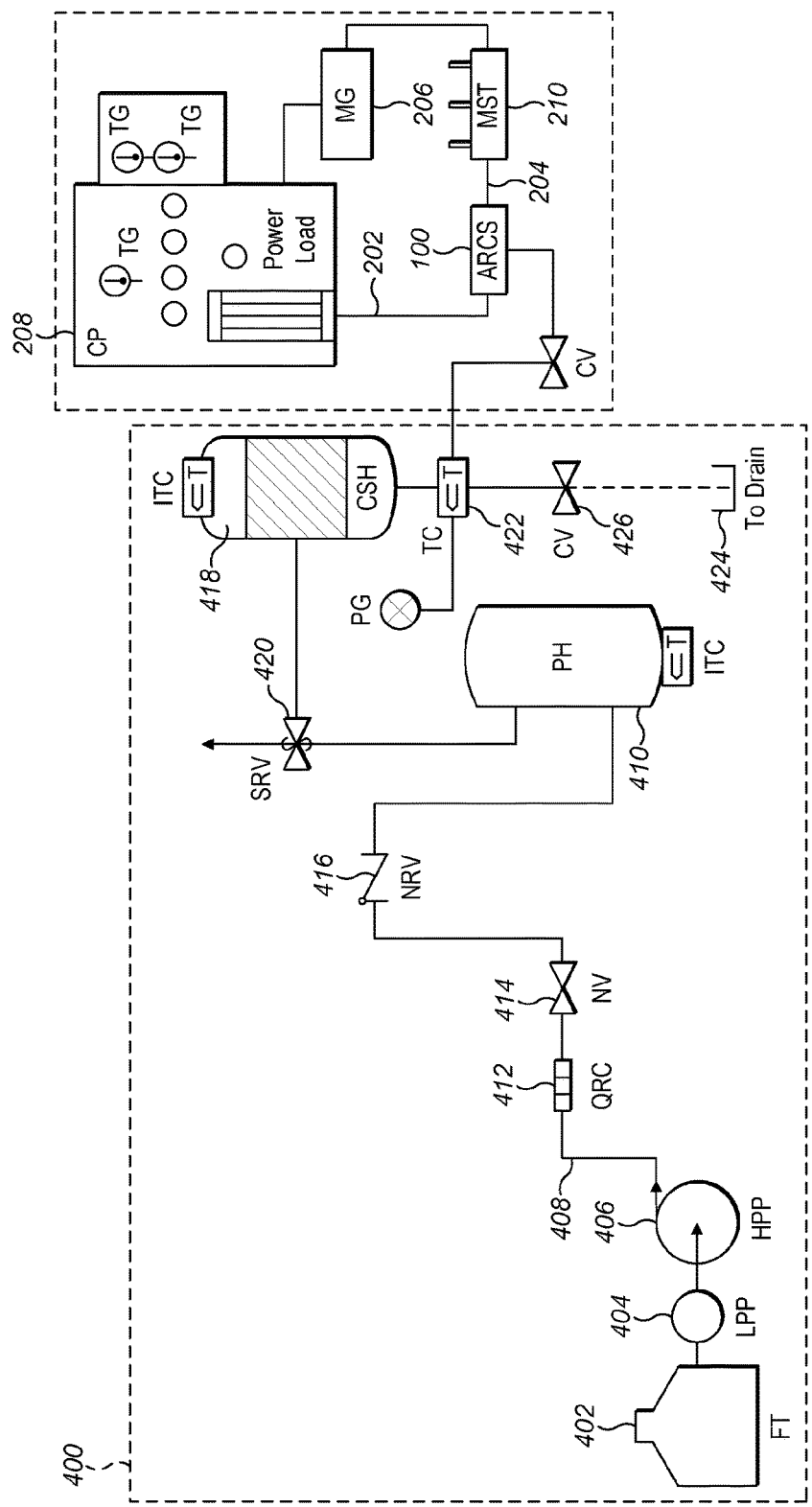
FIG. 11 shows a schematic diagram of an example system of the present invention, including a heater assembly providing an energised fluid to the apparatus and a tunable microwave generator.

FIG. 11 illustrates a schematic diagram of the apparatus 100 of the present invention when operatively coupled to an EMR generator 206 (e.g. 0 to 100 W input, 2.45 Ghz), a power source 208 and an EMR tuner 210 via an input transmission line 202 and an output transmission line 204, so as to form a closed-loop with the EMR waveguide bar 130. The EMR tuner 210 is adapted to control the reflected energy from the electromagnetic energy (e.g. microwave) transferred into the waveguide bar 130 and coupled into the reactor chamber 103. The EMR tuner 210 may be a manually controllable trombone tune or any automatically adjustable tuner adapted to minimise EMR reflection of the electromagnetic radiation provided by the EMR generator and coupled into the EMR waveguide bar 130 (e.g. between 0 and 5% of reflective energy input).

In one embodiment of the present invention, a staged heater assembly 400 "feeds" energised fluid through the injection port 104 and into the reactor chamber 103. The heater assembly 400 comprises, inter alia, a fluid tank 402 (e.g. 23 liter or 5 Gallon volume capacity), adapted to store and provide any fluid (e.g. water), and a low pressure pump 404 (e.g. 4 to 6 psi or 0.3 to 0.4 bar at flow rate of 150 liter/hour), adapted to move the fluid to a high pressure pump 406 (e.g. 120 bar at flow rate of 300 liter/hour). A fluid line 408 connects the high-pressure pump 406 to a pre-heater 410 (e.g. 310° C., 4 to 11 kv hour), so that fluid can be moved from the fluid tank 402 into the pre-heater 410. The fluid line 408 may comprise a quick release coupler 412, therefore, allowing a plurality of different fluid tanks (e.g. each containing a different fluid type) to be connected to the pre-heater 410 by simply disconnecting one fluid tank and re-connecting to another. The fluid line 408 may further comprise an in-line needle valve 414 for flow control (e.g. 300° C./160 bar rating) and a non-return valve 416 (set at 120 bar, 300° C. rating).

The output of the pre-heater 410 is fluidly connected to a super-heater 418 (600° C.) via a safety relief valve 420 (set at 1900 psi or 130 bar/600° C. rating). Both, the pre-heater 410 and the super-heater 418 have an in-built thermocouple.

The output of the super-heater is fluidly coupled to the injection port 104 of the main reactor unit 100 via a four-way cross connector 422, which has a built-in thermo couple and a pressure gauge (e.g. a 220 bar gauge). The four-way cross connector 422 is also fluidly connected to an exhaust or drain 424 via a needle control valve 426.

A main control panel (not shown) houses any power switches for any one of the heaters 410, 418, pumps 404, 406, EMR generator 206, an emergency shut down switch for the power supply, and the temperature gauges from the thermo couples in-built in the heaters 410, 418, as well as, the thermo couple measuring the temperature to the drain 424 and to the injection port 104 of the main reactor unit 100.

During operation of the system of the present invention, any fluid (stored in the fluid tank 402) or solid may be passed through a gasification process and/or heater assembly 400 so that the fluid achieves "cracking" temperature. Once the fluid starts to "crack" (similar to cracking in an oil refinery, i.e. the predetermined temperature turns all of the fluid or solid into a gaseous state) the energised fluid (i.e. free radicals gas) enters the reactor chamber 103, where microwaves of a predetermined wavelength (i.e. a wavelength suited for the particular fluid, e.g. water vapour gas) are coupled into the fluid so as to form a fluid of a higher energy state. Electromagnetic radiation from an ancillary EMR source (e.g. infrared light) may be applied to stabilise the "energy coupling" between the fluid and the microwaves. The highly energised fluid is then released via the ejection port 108 where it can be utilised as work.

Example Using Water as Fuel Source

Work may be provided by a standard gas turbine using the "fuel" (any liquid, gas or element that can be gasified) provided by the apparatus of the present invention (e.g. from water). In particular, during use, the water (as a fuel source) is pressurised to around 80 to 130 bar and the temperature is first increased to about 310 degrees centigrade and then to a temperature of about 560 degrees centigrade (via heater assembly 400), thus, causing thermal cracking of the atoms ripping hydrogen atoms from the oxygen atoms (normally 3 to 50% of the hydrogen is released during the thermal cracking stage as well as creating charged particles and free radicals). These gases then pass into the reactor chamber 103 where a very strong magnetic field is created from the interaction with the microwave provided by the microwave generator 206. The intense magnetic field then "charges" the atoms of the gas so as to create highly charged atoms. The sub-atomic particles of the highly charged atoms (including electrons and ions) collide with each other. The addition of an ancillary radiation provided, for example, by infrared light, the reaction in the reactor chamber 103 continues as the gases are ejected out of the main reactor unit 102.

The ejected gas may be combusted to release the energy in a controlled fashion. For example, when used with a gas turbine, atmospheric air flows through a compressor increasing the fluid pressure. Energy is then added by spraying the "fuel" into the pressurized air and igniting it so that the combustion generates a high-temperature flow. The high-temperature high-pressure gas then enters the turbine, where it expands down to the exhaust pressure, producing a shaft work output in the process. The turbine shaft work is then used to drive the compressor and other peripheries, such as an electric generator, that may be coupled to the shaft. The energy that is not used for shaft work comes out in the exhaust gases, so these have either a high temperature or a high velocity.

Also, the apparatus 100 of the present invention is designed to be like injectors which are found in gas turbines and can be used to replace existing injectors, therefore, enabling water to be used as a fuel source. Also, the exhaust gases of the gas turbine could be used after initial start up to replace the function of the pre-heater and critical super-heater.

Example Waste-to-Energy System

Figure 13:
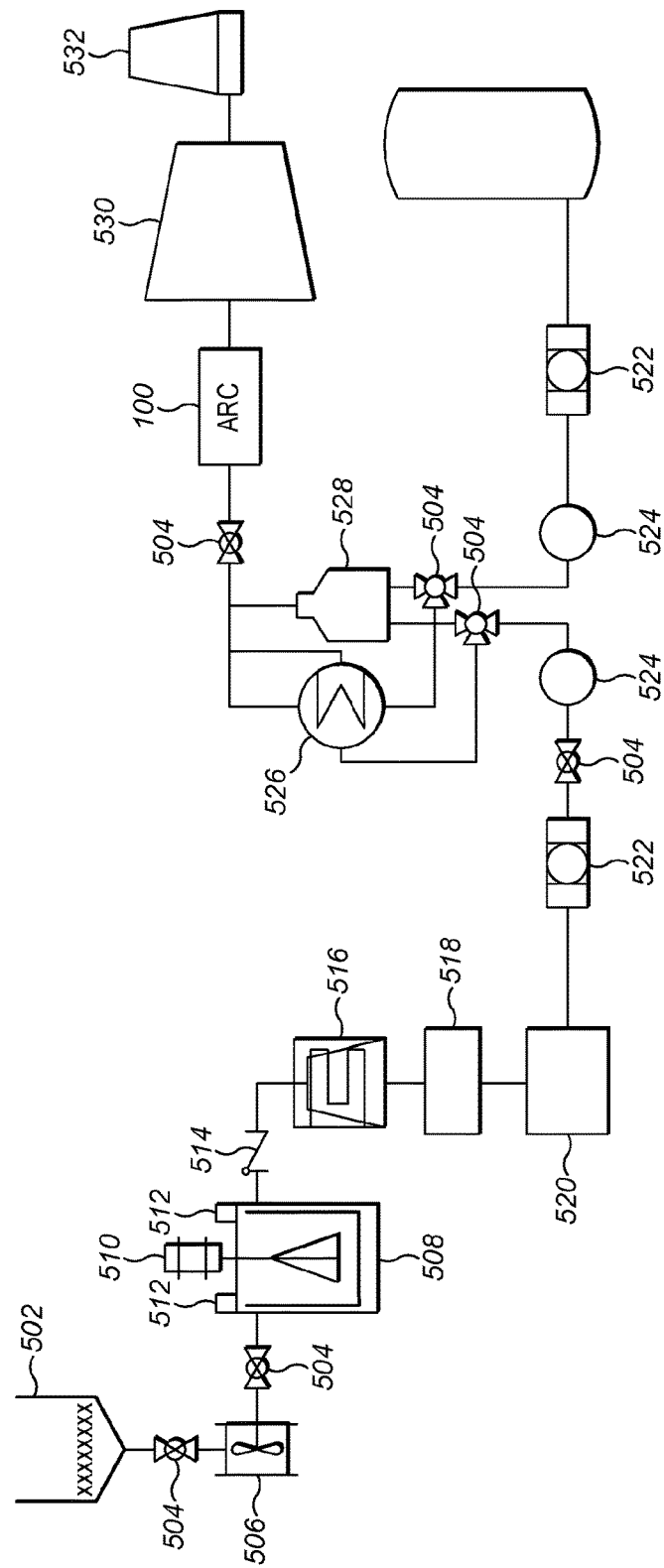
FIG. 13 shows a schematic diagram of a plastic pyrolysis system utilising the apparatus of the present invention.

An alternative example application of the system of the present invention is shown in FIG. 13, where a Waste-To-Energy (WTE) system 500 utilises the apparatus 100 of the present invention so as to allow greater extraction from the "fuel" produced via pyrolysis and, at the same time, achieve a gas clean up effect. In particular, in the example shown in FIG. 13, plastics are used to extract fuel (e.g. diesel) through pyrolysis. The system comprises a chipper 502, control valves 504, a blower 506, a reactor pot 508 including a mixer 510 and di-electric magnetrons 512, a non-return valve 514, a condenser 516, an oil catch tank 518, a fuel tank 520, a filter 522, high-pressure pumps 524, a heat exchanger 526, a critical super-heater 528, a gas turbine 530, and an exhaust 532. The apparatus 100 of the present invention 100 is positioned upstream of the gas turbine 530 and downstream of the super-heater 528.

Example Operation Procedure (i) Test Setup

This section covers how to operate the microwave generator 206 before testing the apparatus of the present invention. The main objective is to get the microwave generator 206 operating at a steady state temperature and to tune the cavity for a known dry condition. The preferred approach is to setup and activate the microwave generator 206 first and let it run for about 10 minutes. This way the system of the present invention is in a known condition and any changes in microwave performance when the system is activated will be known to occur due to excessive moisture in reactor chamber 103.

(ii) System Setup

STEP 1: Connect the microwave generator 206 via the power source 208 and a coaxial cable 202 to the main reactor unit 100.

STEP 2: The output of the main reactor unit 100 is connected to the 3-stub trombone tuner 210.

STEP 3: The 3-stub trombone tuner 210 is connected via a coaxial cable 204 to the microwave generator 206.

(iii) Generator Setup

STEP 1: START/STOP is OFF.

STEP 2: Set the power to 50 W and the reflected power to 50 W. Ensure that the SWEPT button is activated.

(iv) Generator Warm-Up

STEP 1: Activate START/STOP button.

STEP 2: Check that the reflected power reading is less than 5 W. If the reflected power is less than 5 W then the system is setup correctly. It is possible to get a reflected power of 0 W by tuning the trombone tuner, if the reactor chamber 103 is suitably clean and dry. Also, a power cycle of the microwave generator can ensure repeatable performance. However, if the reflected power reading is not stable and jumps up to, for example, 25 W then it is likely that the reactor chamber 103 is contaminated with moisture or debris.

STEP 3: If the reflected power is greater than 5 W then vary the tuner until the reflected power is 5 W or less.

STEP 4: Leave the generator running for at least 10 minutes in order for the system to operate at a predetermined working temperature and to achieve a stable microwave generator 206 performance.

STEP 5: Check the microwave generator if possible to ensure it is heating up. This confirms that microwave energy is passing through the reactor chamber 103.

(v) During System Activation

STEP 1: Check that reflected power level.

STEP 2: If the reflected power is less than 10 W then it is likely that the microwave system is still effective at introducing microwaves into the reactor chamber 103. The trombone tuner may be adjusted to achieve a better match.

STEP 3: If the reflected power is at 25 W or more, then there may be moisture in the coaxial line before the ceramic puck, which should be contaminant free. However, if tuning is ineffective then this suggests that microwaves are not passing through the chamber due to moisture and debris in the air coaxial line.

STEP 4: Deactivate the START/STOP switch at the end of the ARC test.

(vi) Microwave Behaviour when the System is Activated

Before the system is activated the reactor chamber 103 and the coaxial lines 202, 204 should be clean and dry. (The electromagnetic radiation (EMR) waveguide includes an optical interface 105 adapted to couple electromagnetic radiation of the first wavelength into the reactor chamber.) In this condition it is expected that the microwaves will behave achieve the expected effect on the injected fluid. When activated the microwave generator 206 will experience a temperature increase and the reflected power reading at the generator 206 may be low.

Once the system is activated and energised fluid (e.g. hot gases) is injected, the reactor chamber 103 may experience very high temperatures and pressures. There is a risk that some fluid may leak past the ceramic disc/sealant barrier and into the coaxial line 202, 204. However, when the hot gas cools down, moisture may build up in the coaxial lines 202, 204 causing a dramatic effect on the microwave performance. The operator may notice an increase in the reflected power reported on the microwave generator. The increase in reflected power may be due to the moisture in the coaxial lines 202, 204, which is reflecting the microwaves and therefore preventing them reaching the reactor chamber 103.

Figure 12A:
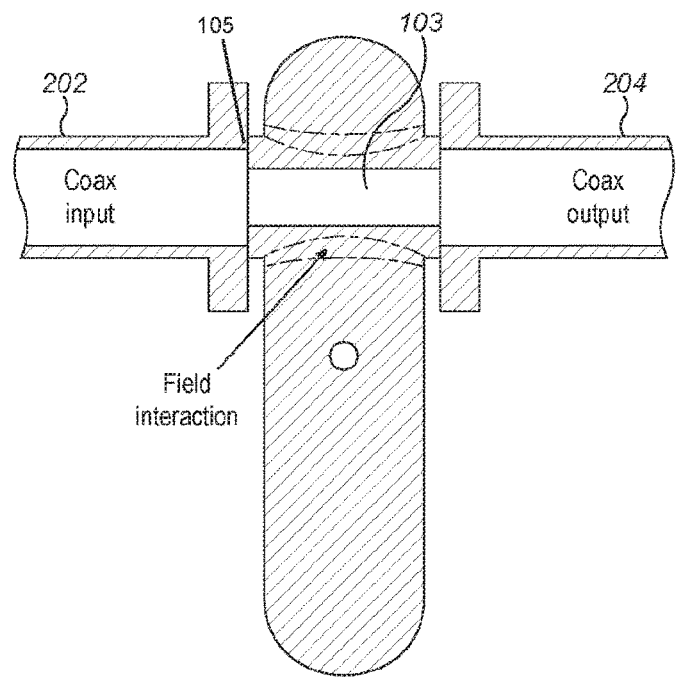
FIG. 12 shows a (a) sectional view and (b) a perspective view of an ideal field inside the reactor chamber of the apparatus of the present invention.
Figure 12B:
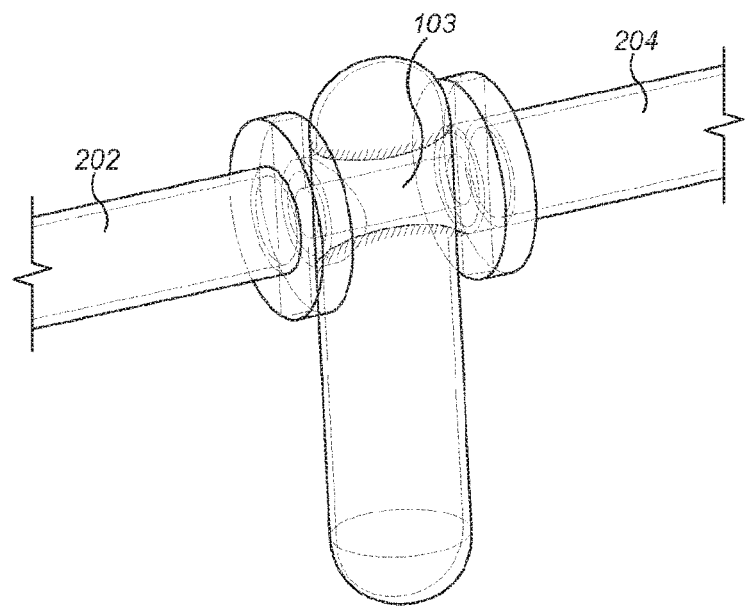

FIGS. 12 (*a*) and (*b*) shows an example illustration of the ideal field interaction between the injected fluid and the microwaves inside the reactor chamber 103. Here, the microwaves energise the particles and free radicals of the gas so as to cause a strong magnetic field within the reactor chamber 103. The then increased collisions between the protons and electrons create a chain reaction that generating energy (heat).

In another alternative example application, exhaust flue gases may be "cleaned" (i.e. reduction of harmful exhaust such as NOX, CO etc.) by providing the apparatus 100 (comprising an EMR source operatively coupled to the apparatus via the waveguide bar 130) within the exhaust output path. For example, the apparatus 100 may be provided at the exhaust of a combustion engine (e.g. diesel or petrol) of a vehicle to reduce or even remove harmful components from the exhaust gas. After "clean-up" by the apparatus 100, the exhaust gas may contain a higher percentage of oxygen, so that the "cleaned" may be recycled into the combustion engine to improve the energy efficiency of the engine. In another example, an array assembly of the apparatus 100 of the present invention may be provided in the flue gas stack of a power plant. In particular, the array assembly may be made of a plurality of reactor units of the apparatus 100 of the present invention arranged so as to form an assembly adapted to fit into the chimney of the flue gas stack, wherein the parallelly arranged plurality of reactor units are operably coupled to either one single EMR source, or a plurality of EMR sources, so as to activate the apparatus 100.

It will be appreciated by persons skilled in the art that the above embodiment has been described by way of example only and not in any limitative sense, and that various alterations and modifications are possible without departing from the scope of the invention as defined by the appended claims.

The invention claimed is:

1. A system for increasing energy output of a fluid substance, comprising:
at least one fuel activation and energy release apparatus, comprising:
a fluidly sealable reactor chamber, adapted to withstand a predetermined fluid pressure and temperature;
a fluid injection port, adapted to provide a one-way fluid communication from an external fluid reservoir to said reactor chamber;
a fluid ejection port, adapted to provide a one-way fluid communication from said reactor chamber to an external region, so as to controllably release an energized fluid substance from said reactor chamber;
at least one first electromagnetic radiation (EMR) waveguide, having a first waveguide input port and a first waveguide output port, operably coupled within said reactor chamber and adapted to couple electromagnetic radiation of a predetermined first wavelength to said energized fluid substance injected into said reactor chamber; and
at least one second electromagnetic radiation waveguide, having a second waveguide input port operably coupled to said reactor chamber, adapted to couple electromagnetic radiation (EMR) of a predetermined second wavelength to said energized fluid substance injected into said reactor chamber;
a tunable EMR generator, operably coupleable to said at least one first electromagnetic radiation (EMR) waveguide of said at least one fuel activation and energy release apparatus, wherein said EMR generator is a microwave generator and is configured to generate the electromagnetic radiation of the predetermined first wavelength between 1 mm and 1 meter at a respective frequency spectrum of 300 GHz to 300 MHz;
an ancillary EMR source, operably coupleable to said at least one second electromagnetic waveguide input port and configured to generate the electromagnetic radiation of the predetermined second wavelength between 700 nm and 1 mm at a respective frequency spectrum of 430 THz to 300 GHz;
a working medium reservoir, fluidly coupleable to said reactor chamber of said fuel activation and energy release apparatus and adapted to store and supply a working medium; and
a heater assembly, fluidly coupleable between said working medium reservoir and said reactor chamber, and adapted to transfer energy to said working medium, so as to provide the energized fluid substance at a predetermined temperature and pressure into said reactor chamber of said fuel activation and energy release apparatus.

2. A system according to claim 1, wherein said EMR generator further comprises an input transmission line, operably coupleable to said first waveguide input port of said first electromagnetic radiation (EMR) waveguide, and an output transmission line, operably coupleable to said first waveguide output port of the first electromagnetic radiation (EMR) waveguide, wherein said microwave generator, said input transmission line and said output transmission line are adapted to form a closed-loop EMR circuit with said first electromagnetic radiation (EMR) waveguide of the fuel activation and energy release apparatus.

3. A system according to claim 2, further comprising an EMR tuner operably coupled to said output transmission line and adapted to minimize reflection of electromagnetic radiation (EMR) of the predetermined first wavelength generated by said EMR generator and coupled into said first electromagnetic radiation (EMR) waveguide of the fuel activation and energy release apparatus.

4. A system according to claim 3, wherein said EMR tuner is further adapted to maximize energy transfer from the electromagnetic radiation (EMR) of the predetermined first wavelength to the energized fluid substance injected into the reactor chamber of the fuel activation and energy release apparatus.

5. A system according to claim 4, wherein said EMR tuner is a manually controlled trombone tuner.

6. A system according to claim 4, wherein said EMR tuner is an automatically controlled EMR tuner.

7. A system according to claim 1, wherein said fluid ejection port is selectively closable.

8. A system according to claim 1, wherein said at least one first EMR waveguide is coaxially mounted within said reactor chamber.

9. A system according to claim 1, wherein said predetermined fluid pressure is greater than 50 bar and said predetermined temperature is greater than 300 degrees centigrade.

10. A system according to claim 9, wherein said predetermined fluid pressure is greater than 100 bar and said predetermined temperature is greater than 500 degrees centigrade.

11. A system according to claim 10, wherein said predetermined fluid pressure is greater than 150 bar and said predetermined temperature is greater than 600 degrees centigrade.

12. A system according to claim 1, wherein said at least one first electromagnetic radiation (EMR) waveguide is made of a material with low bulk resistivity (Ohm·cm).

13. A system according to claim 1, wherein said at least one first electromagnetic radiation (EMR) waveguide is made of any one of aluminum, copper, silver and gold.

14. A system according to claim 1, wherein said at least one first electromagnetic radiation (EMR) waveguide comprises an optical interface adapted to couple electromagnetic radiation of said predetermined first wavelength into said reactor chamber.

15. A system according to claim 14, wherein said optical interface comprises a first interface member operably coupled to said waveguide input port of said at least one first electromagnetic radiation (EMR) waveguide and a second interface member operably coupled to said waveguide output port of said at least one first electromagnetic radiation (EMR) waveguide.

16. A system according to claim 1, wherein said heater assembly comprises at least one pre-heater, disposed downstream of said working medium reservoir, and at least one super-heater, disposed downstream of said pre-heater.

17. A system according to claim 1, further comprising at least one fluid pump, disposed downstream of said working medium reservoir and downstream of said heater assembly, and adapted to move said working medium from said working medium reservoir towards the reactor chamber of said fuel activation and energy release apparatus.

18. A system according to claim 1, further comprising at least one pressure control device, adapted to monitor and regulate a pressure of said energized fluid substance.

19. A system according to claim 1, wherein said microwave generator is any one of a Klystron, a Gyrotron and a Magnetron.

* * * * *